March 31, 1959  A. M. LANCASTER ET AL  2,879,828
METHOD OF TIRE MANUFACTURE
Filed Oct. 10, 1955  3 Sheets-Sheet 1
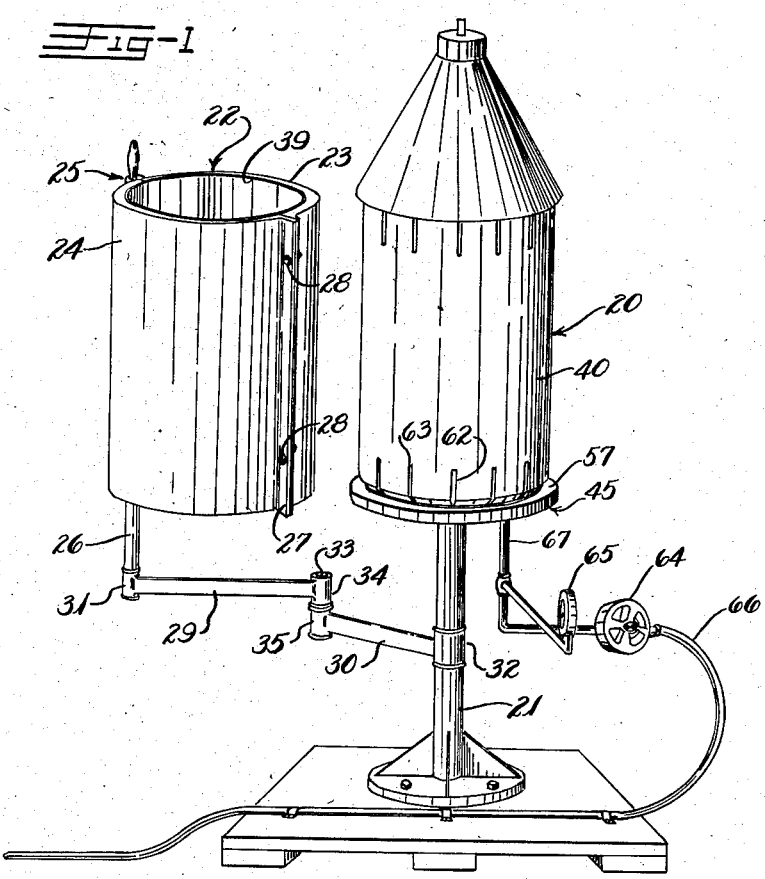
INVENTORS
ARTHUR M. LANCASTER
JACK L. HOLLIS
BY
W. A. Fraser
ATTY.

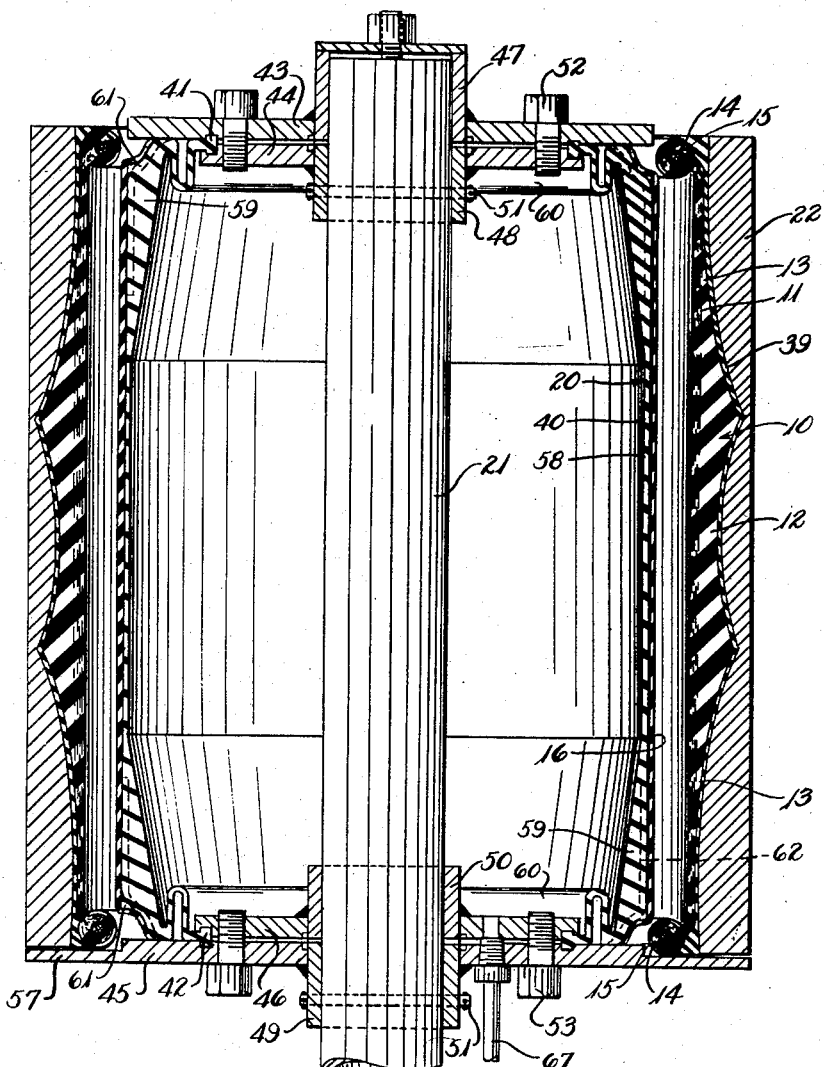

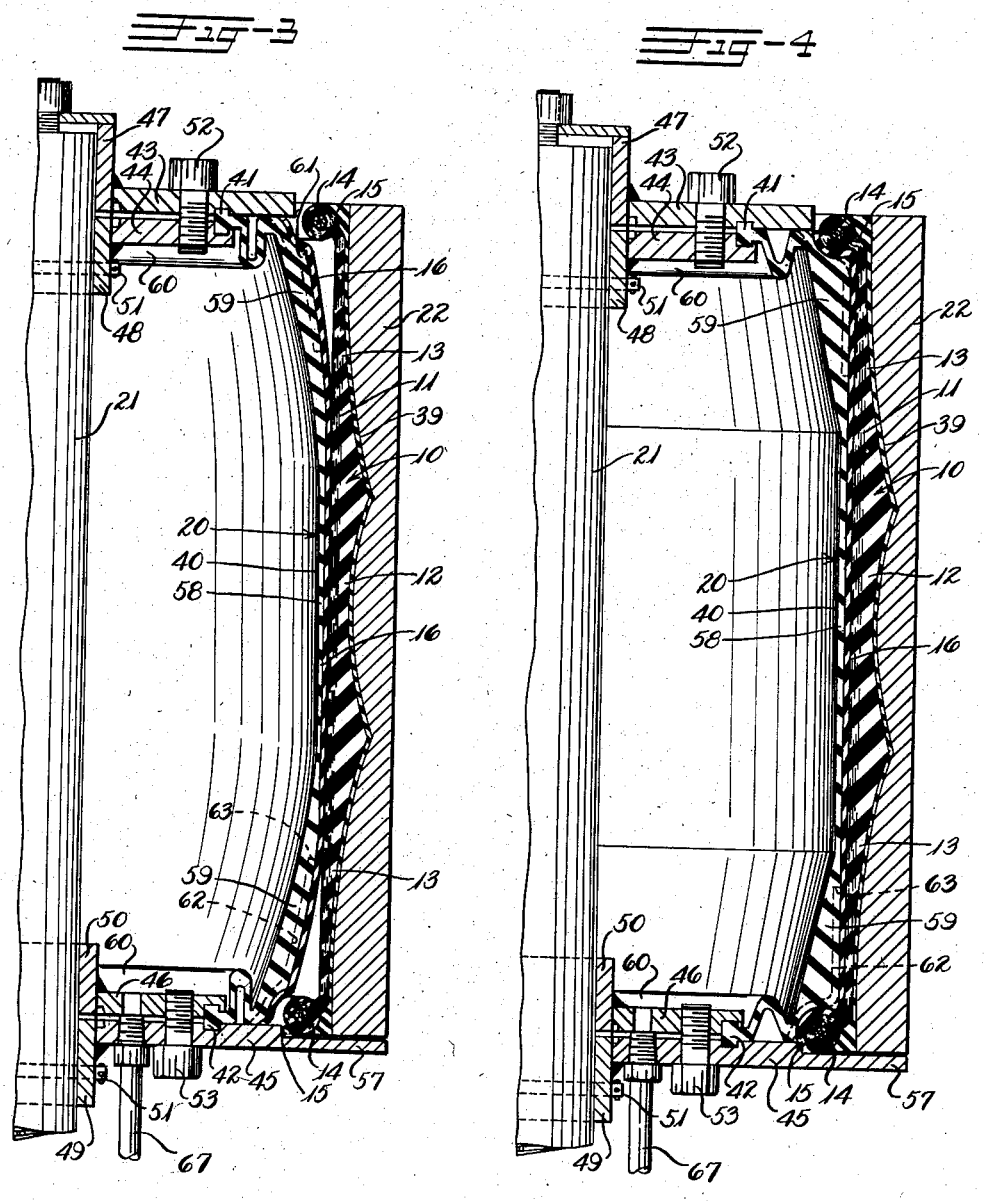

United States Patent Office 2,879,828
Patented Mar. 31, 1959

2,879,828

METHOD OF TIRE MANUFACTURE

Arthur M. Lancaster and Jack L. Hollis, Akron, Ohio, assignors to The Firestone Tire & Rubber Company, Akron, Ohio, a corporation of Ohio Application October 10, 1955, Serial No. 539,476

2 Claims. (Cl. 154—9)

This invention relates to the manufacture of pneumatic tubeless tires and more particularly to a method and means of applying an impervious lining to the interior of an unvulcanized tire just prior to the final molding and vulcanizing operation.

It is desirable in the manufacture of tires, particularly in the present stage of development, to use substantially the same manufacturing techniques both for tubeless tires and for conventional tires which are inflated with tubes. The present invention makes this possible by providing a method and means of applying an air-imprevious lining to the interior of a conventional tire just after it is removed from the tire building drum and before it is subjected to the shaping and curing operations. Thus, a tire can be built on a building drum by the use of conventional methods and materials and then either sent directly to the mold room for curing into a standard tube tire or converted into a tubeless tire by the addition of the lining. The decision whether to subject the tires to this conversion step will, of course, depend upon production and delivery schedules of the two different types of tires. For example, if a thousand tires are coming off a tire building line and unexpected orders for tubeless tires should come up, these tires could be converted into tubeless tires by adding air-impervious linings, whereas if it is desired to fill an order for conventional tires, the same tires would be sent directly to the curing room. The present invention thus gives a flexibility to the manufacturing of tires which is highly desirable from the standpoint of production costs and schedules.

It is accordingly an object of the present invention to provide a method and means of converting a conventional green carcass of a pneumatic tire into a carcass which can be molded into a tubeless tire.

Another object is to provide a method and means of applying an air-impervious lining to the inside of an uncured tire.

Another object is to provide simple and effective means for applying an air-impervious lining to the interior of an uncured tire in a manner which prevents the entrapment of air between the lining and the body of the tire.

Further objects and advantages will be more fully apparent from the following description of a preferred form of the invention, reference being had to the accompanying drawings in which:

Figure 1 is a perspective view of apparatus, embodying the invention, which is adapted to apply an air-impervious lining to the interior of an uncured tire;

Figure 2 is a fragmentary longitudinal section, on a somewhat enlarged scale, of the apparatus of Figure 1 with the parts in operative position and with a sleeve of impervious material ready to be pressed into contact with an uncured tire;

Figure 3 is a fragmentary view corresponding to Figure 2 showing the relation of the parts and the tire in an intermediate stage of the pressing operation; and Figure 4 is a view similar to Figure 3 showing the parts at the end of the pressing operation with the lining in full contact with the tire.

As pointed out above, the present invention is employed in converting the uncured carcass of a tire, indicated generally at 10, into a tubeless tire just after it is removed from the tire building drum. Such a tire 10 is built on a tire building drum in the usual manner by uniting a suitable number of fabric or body plies 11 with a tread 12, and sidewalls 13, the body plies being wrapped about and securely anchored to inextensible beads 14.

In the present example, the bead portions 14 are provided with chafer strips 15 of square-woven nylon monofilament fabric, the use of such chafer strips being desirable in tubeless tires for the reasons pointed out in the co-pending application of M. P. Hershey, Serial No. 301,720, filed July 30, 1952, now abandoned, although any one of the several other known equivalents might be substituted for these chafer strips if desired. The construction of the tire 10, as just described, except for the provision of the monofilament chafer strip 15, is identical with that of conventional tires which are inflated by the use of tubes. Such a tire may be taken directly to the curing room, placed in molds and subjected to heat and pressure to produce the finally vulcanized tire.

It is at this stage of manufacture that the present invention is employed to convert such a tire into a tubeless tire by pressing an air-impervious lining indicated at 16 against the interior walls of the tire. Such a lining preferably comprises a mixture of natural rubber or any one of several synthetic rubbers, such as Butyl rubber, producing a material which is relatively impervious to the passage of air and fluids and which will adhere firmly to the inner surfaces of the tire. Once such a lining 16 has been inserted into the tire and pressed into intimate contact with the tire, the tire is taken to the curing room and cured by conventional apparatus and methods to produce the desired tubeless tire. In the curing step the lining 16 becomes integral with the tire.

A preferred form of apparatus for applying such an impervious lining 16 to a tire is illustrated in Figure 1. Such apparatus comprises an expansible bellows, indicated generally at 20, which is suitably mounted on a column 21 in such a manner that a tire 10 can be slipped over the bellows to take the position shown in Figures 2-4. Enough clearance exists between the tire and the bellows to permit a sleeve of impervious lining material 16 to be positioned between the tire and the bellows; see Figure 2. The arrangement is such that air or liquid under pressure controllable by valve 64, and indicated by gauge 65, can be passed into the bellows 20 through tubing 66, and conduit 67 to expand said bellows radially outwardly and thereby press the lining 16 into intimate contact with the interior of the tire.

In order to support the tire against the outward pressure of the bellows, a supporting jacket, indicated at 22, is mounted on the column 21. The jacket is cylindrical in form and preferably comprises two semi-cylindrical sections 23 and 24 which are hinged as indicated at 25 on an upright rod 26 so that they can be opened to receive the tire and then closed about the tire to support it while the lining is applied. The sections 23 and 24 have radial flanges 27 which are adapted to fit snugly together when the sections 23 and 24 are in closed position and suitable securing means such as bolts 28 are provided to hold the flanges together and to secure the sections against the outward pressure of the bellows during the pressing operation.

The jacket 22 is supported from the column 21 by arms 29 and 30 which are pivoted respectively to the hinged rod 26 and the column 21 as indicated at 31 and 32, and the arms are hinged together by means of a pin 33 extending through the terminal sleeves 34 and 35 of the arms.

With this type of hinged support, the jacket 22 is moved into position about the tire by moving the hinge-rod 25 toward the column 21, this movement being permitted by the pivoting of the arms about the rod and the stand and about hinge pin 33. During this movement the sections 23 and 24 remain open. When the jacket is immediately adjacent the tire, the sections 23 and 24 are closed to encompass the tire and the flanges 27 are locked together by the bolts 28.

Since the building of tires on a tire building drum is not a precision operation, the size and dimensions of uncured tires may vary somewhat. To accommodate tires having such varying dimensions, the supporting jacket 22 is lined with a cushion 39 of rubber. The rubber lining will deform slightly when the jacket is enclosed by the tire and will conform closely to the tire during the pressing operation to give the tire the necessary support.

The expansion bellows 20 comprises a hollow cylindrical rubber body 40 terminating in thickened edges 41 and 42 which are clamped at the top of the bellows by the end plates 43 and 44 and at the bottom of the bellows by similar plates 45 and 46, as shown. The plates 43—46 may be secured to the column 21 by any suitable means. In the present construction the plates extend outwardly from supporting collars 47–50, respectively, which have a telescoping fit on the column. The lower collars 48 and 49 are secured in the desired positions on the column by pins 51 extending through the collars and the column. The sleeves 47 and 50, and hence the plates 43 and 46, it will be noted, are movable on the column. The plate 43 is drawn toward plate 44 by the machine screws 52 and the plate 46 is likewise drawn toward the plate 45 by similar screws 53 to clamp the edges 41 and 42 of the bellows within the annular grooved recesses in the plates. Suitable means to prevent fluid pressure escape is provided between sleeves 47–50 and column 21 and around pins 51.

Preferably the plate 45 extends radially outwardly beyond the plate 46 to provide a support 57 for the tire and also the sleeve of impervious material. The supporting flange 57 is positioned in a plane slightly below the lower edge of the sections 23 and 24 of the supporting jacket so that the sections may be moved over the surface into close contact with the tire.

The flange extension 57 also provides support for the air-impervious lining which initially is in the form of an uncured cylindrical sleeve which is cut to length from sheet stock and spliced to form a cylinder which fits with a frictional fit over the body of the expansion bellows or bag. The sleeve is of such length that after it is pressed into contact with the tire it will extend about halfway around the beads of the tire; see Figure 4.

In pressing the lining into contact with the tire it is important that the air between the lining and the tire be completely expelled. Otherwise the entrapped air collects in blisters and prevents the formation of a firm bond between the lining and the tire. To solve this problem, the present invention contemplates a bellows construction which produces a rolling contact between the bellows and the interior of the tire and which progressively rolls the lining against the tire. As the bellows rolls the lining into contact with the tire the air is pushed ahead of the rolling line of contact, finally to be forced from the open ends of the tire.

In the preferred form of the invention, the bellows first engages the tire in the center portion of the tire and then gradually makes contact from the center toward the ends of the tire. If desired, however, a bellows might be used which makes initial contact with the tire at one end and then progressively contacts the tire towards the other end.

To achieve this result, the bellows wall thickness is thinnest at the central portion 58 of the bellows and then increases progressively and gradually in thickness to produce the tapered end wall portions 59, see Figures 2–4.

The expansion of the bellows takes place in part by the stretching of the cylindrical wall and in part by the distortion of the folds 60 at each end of the bellows. Preferably, the material comprising this fold is of such a thickness and resilience as to be somewhat stiffer and slower in its response to the increased fluid pressure within the bellows than the central thin wall 58, to insure that the bellows will first contact at the center of the tire as shown in Figure 3 and then progressively make contact outwardly towards the ends of the tire.

The folds 60 permit the heavy-walled end portions 59 of the bellows to move bodily outwardly at the end of the pressing operation and also permit the slight axial contraction which takes place in the bellows as it expands radially. This contraction can be observed by comparing Figures 2 and 4 in which the cylindrical length of the bellows is shown to be somewhat greater than the bead spacing of the tire at the beginning of the pressing operation, whereas at the end of the pressing operation the cylindrical length has contracted to the exact spacing of the beads of the tire. Where the bead spacing of the tire is approximately 17¾", a bellows having an unexpanded cylindrical length of about 17" can be used.

The added thickness of the bellows at the end portions 59 gives a stiffness to the bellows which enables the lining to be forced with considerable pressure against the beads of the tire. Thus, to a certain extent, the end portions of the bellows act as rigid molding members in the later stages of the pressing operation and force the lining to conform to the tire beads. Preferably, the corners 61 of the bellows are shaped so as to conform rather closely to the tire beads.

While the progressive contact of the bellows with the tire forces the air out from between the lining and the tire and between the bellows and the tire, it is desirable in addition to groove the ends of the bellows as at 62, to vent the air freely from between the tire and the bellows, and ensure full contact of the two. The grooves 62 are about ¼ inch wide, about ⅛ inch deep and about 3 inches long, and extend to a point 63.

While a preferred form of the invention has been described, various changes will be apparent to those skilled in the art without departing from the spirit and scope of the invention, the essential features of which are summarized in the appended claims.

We claim:

1. Apparatus for expanding a cylindrical sleeve of rubbery material into forcible contact with the interior a tire body prior to vulcanization of said tire to form an inner liner therein, said apparatus comprising an outer jacket enclosing said tire body and supporting said tire externally, a resilient, substantially cylindrical bellows adapted to receive said tire and said sleeve in telescoping relationship, with said sleeve positioned over said bellows and between said bellows and said tire, said bellows having a cylindrical wall extending axially a distance substantially equal to the axial length of said sleeve and adapted to engage and support the inner surface of said sleeve throughout the entire extent thereof, said bellows wall tapering from a minimum thickness at the central portion of said bellows to a maximum adjacent the ends thereof, said bellows wall having at said ends folded, radially inwardly extending, annular portions terminating in edges, means to introduce fluid under pressure into said bellows to bulge said central thin-walled portion thereof outwardly and to force the central portion of said sleeve into contact with said tire and subsequently to expand the bellows end portions of tapering thickness to bring the end portions of said sleeve progressively from said central portion into rolling contact with the end portions of said tire, and with the final contact taking place by expansion of said folded portions, whereby the air between said sleeve and said tire is expelled and a firm, uniform union between said sleeve and tire is produced.

2. Apparatus according to claim 1, and means rigidly clamping said edges of said cylindrical bellows, and annular guide means comprising end plates abutting the ends of said bellows and said sleeve.

References Cited in the file of this patent

UNITED STATES PATENTS

| | | |
|---|---|---|
| 2,182,176 | Maranville | Dec. 5, 1939 |
| 2,517,889 | Kuffler | Aug. 8, 1950 |
| 2,521,143 | Benson | Sept. 5, 1950 |
| 2,614,056 | Kraft | Oct. 14, 1952 |
| 2,685,909 | Deist | Aug. 10, 1954 |
| 2,752,978 | Kindle et al. | July 3, 1956 |
| 2,814,330 | Vanzo et al. | Nov. 26, 1957 |